US009014420B2

(12) United States Patent
Liu et al.

(10) Patent No.: US 9,014,420 B2
(45) Date of Patent: Apr. 21, 2015

(54) ADAPTIVE ACTION DETECTION (75) Inventors: Zicheng Liu, Bellevue, WA (US);
Liangliang Cao, Urbana, IL (US)

(73) Assignee: Microsoft Corporation, Redmond, WA (US)

(\*) Notice: Subject to any disclaimer, the term of this patent is extended or adjusted under 35 U.S.C. 154(b) by 229 days.

(21) Appl. No.: 12/814,507

(22) Filed: Jun. 14, 2010

(65) Prior Publication Data

US 2011/0305366 A1 Dec. 15, 2011

(51) Int. Cl.
*G06K 9/00* (2006.01)

(52) U.S. Cl.
CPC ................................ *G06K 9/00711* (2013.01)

(58) Field of Classification Search
USPC .................... 382/103, 243; 702/187
See application file for complete search history.

(56) References Cited

U.S. PATENT DOCUMENTS

| 6,597,738 | B1* | 7/2003 | Park et al. | 375/240.16 |
|---|---|---|---|---|
| 2004/0153288 | A1* | 8/2004 | Tovinkere et al. | 702/187 |
| 2008/0208791 | A1* | 8/2008 | Das et al. | 707/1 |
| 2009/0262984 | A1* | 10/2009 | Hildreth et al. | 382/103 |
| 2009/0278937 | A1* | 11/2009 | Botchen et al. | 348/169 |
| 2010/0042563 | A1* | 2/2010 | Livingston et al. | 706/12 |
| 2010/0104158 | A1* | 4/2010 | Shechtman et al. | 382/131 |
| 2011/0263946 | A1* | 10/2011 | el Kaliouby et al. | 600/300 |
| 2012/0121132 | A1* | 5/2012 | Asahara et al. | 382/103 |

OTHER PUBLICATIONS

Piotr et al, ("Behavior recognition via sparse Spatio-temporal features", IEEE workshop on VS-PETS, pp. 1-8, 2005).*
Bruzzone, et al., "Domain Adaptation Problems: A DASVM Classification Technique and a Circular Validation Strategy", Retrieved at << http://ieeexplore.ieee.org/stamp/stamp.jsp?tp=&arnumber=4803844 >>, IEEE Transactions on Pattern Analysis and Machine Intelligence, vol. 32, No. 5, May 2010, pp. 770-787.
Tur, Gokhan., "Co-Adaptation: Adaptive Co-Training for Semi-Supervised Learning", Retrieved at << http://www.speech.sri.com/people/gokhan/pubs/ICASSP09.pdf >>, IEEE International Conference on Acoustics, Speech and Signal Processing, Apr. 19-24, 2009, pp. 3721-3724.
Hu, et al., "Action Detection in Complex Scenes with Spatial and Temporal Ambiguities", Retrieved at << http://vipbase.net/homepage/iccv09_action.pdf >>, In Proceedings of International Conference on Computer Vision (ICCV '09), Oct. 2009, pp. 8.

(Continued)

*Primary Examiner* — Amara Abdi
(74) *Attorney, Agent, or Firm* — Sandy Swain; Peter Taylor; Micky Minhas (57) ABSTRACT

Described is providing an action model (classifier) for automatically detecting actions in video clips, in which unlabeled data of a target dataset is used to adaptively train the action model based upon similar actions in a labeled source dataset. The target dataset comprising unlabeled video data is processed into a background model. The action model is generated from the background model using a source dataset comprising labeled data for an action of interest. The action model is iteratively refined, generally by fixing a current instance of the action model and using the current instance of the action model to search for a set of detected regions (subvolumes), and then fixing the set of subvolumes and updating the current instance of the action model based upon the set of subvolumes, and so on, for a plurality of iterations.

20 Claims, 3 Drawing Sheets

(56) References Cited

OTHER PUBLICATIONS

Duh, et al., "Learning to Rank with Partially-Labeled Data", Retrieved at << http://ssli.ee.washington.edu/people/duh/papers/sigir.pdf >>, Annual ACM Conference on Research and Development in Information Retrieval, Proceedings of the 31st annual international ACM SIGIR conference on Research and development in information retrieval, Jul. 20-24, 2008, pp. 8.

Nigam, Kamal P., "Using Unlabeled Data to Improve Text Classification", Retrieved at << http://reports-archive.adm.cs.cmu.edu/anon/anon/usr/ftp/2001/CMU-CS-01-126.pdf >>, Technical Report, CMU-CS-01-126, May 2001, pp. 138.

Wu, Ying., "Vision and Learning for Intelligent Human-Computer Interaction", Retrieved at << http://vision.eecs.northwestern.edu/papers/thesis/Wu_Ying_PhD_2001.pdf >>, 2001, pp. 173.

Klinkenberg, Ralf., "Using Labeled and Unlabeled Data to Learn Drifting Concepts", Retrieved at << http://reference.kfupm.edu.sa/content/u/s/using_labeled_and_unlabeled_data_to_lear_108780.pdf >>, In Workshop notes of IJCAI-01 Workshop on Learning from Temporal and Spatial Data, 2001, pp. 9.

Yang, et al., "Cross-Domain Video Concept Detection Using Adaptive SVMS", Retrieved at << http://lastlaugh.inf.cs.cmu.edu/alex/p188-yang.pdf >>, International Multimedia Conference, Proceedings of the 15th international conference on Multimedia, Sep. 25-29, 2007, pp. 188-197.

\* cited by examiner

ADAPTIVE ACTION DETECTION

BACKGROUND

Automated recognition of human actions in video clips has many useful applications, including surveillance, health care, human computer interaction, computer games, and telepresence. In general, a trained action classifier (model) processes the video clips to determine whether a particular action takes place.

To learn an effective action classifier model, previous approaches rely on a significant amount of labeled training data, i.e., training labels. In general, this works well for one dataset, but not another. For example, the background, lighting, and so forth may be different across datasets.

As a result, to recognize the actions in a different dataset, heretofore labeled training data approaches have been used to retrain the model, using new labels. However, labeling video sequences is a very tedious and time-consuming task, especially when detailed spatial locations and time durations are needed. For example, when the background is cluttered and there are multiple people appearing in the same frame, the labelers need to provide a bounding box for every subject together with the starting/ending frames of an action instance. For a video as long as several hours, the labeling process may take on the order of weeks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which unlabeled data of a target dataset is used to adaptively train an action model based upon similar actions in a source dataset. In one aspect, the target dataset containing (e.g., unlabeled) video data is processed into a background model. The background model is processed into an action model by using a source dataset with video data (e.g., labeled) that includes action of interest data. The target dataset is searched to find one or more detected regions (subvolumes) where similar action of interest data occurs. When found, the action model is updated based on the detected regions. The action model is refined by iteratively searching with the most current action model, then updating that action model based upon the action of interest regions, and so forth, for a number of iterations. The action model may then be output for use as a classifier.

In one aspect, the background model and action model comprise spatial-temporal interest points modeled as Gaussian mixture models. Searching the target dataset comprises performing a localization task based on scoring a function, in which the searching may comprise branch and bound searching.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an adaptive action detection approach that combines model adaptation and action detection. To this end, the technology trains a background model from unlabeled data (in a target dataset), and uses this background model and labeled training data (in a source dataset) to extract a foreground (action of interest) model (a classifier). The action of interest model may be iteratively refined via further data processing. In this way, the technology effectively leverages unlabeled target data in adapting the action of interest model in a cross-dataset action detection approach. As can be readily appreciated, such cross-dataset action detection is valuable in many scenarios, such as surveillance applications.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video processing in general.

Figure 1:
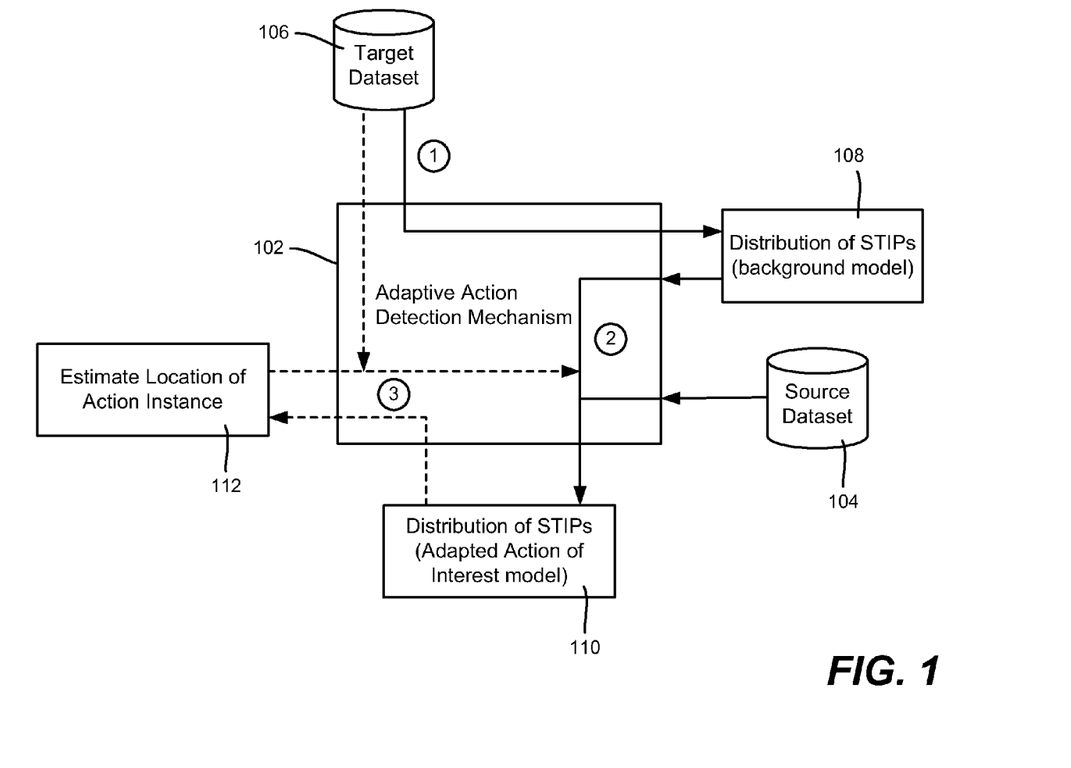
FIG. 1 is a representation of a block/data flow diagram for adaptively learning an action classification model for unlabeled target data.

FIG. 1 is a block diagram showing an adaptive action detection mechanism 102 that reduces the need for training labels/handles the task of cross-dataset action detection with few or no extra training labels. In general, cross-dataset action detection aims to generalize action detection models present in a source dataset 104 to a target dataset 106.

The mechanism 102 processes the source dataset 104, such as containing labeled data in a relatively simpler dataset, e.g., containing only video clips recorded with clean backgrounds, with each video clip involving only one type of repetitive action of a single person. In contrast, in another dataset (e.g., a target dataset 106), the background may be cluttered, and there may be multiple people moving around with occasional occlusions. As described herein, based on the source dataset 104, a background model 108 and an iterative procedure, the adaptive action detection mechanism 102 processes the target dataset 106 to recognize similar actions therein, and iteratively repeats the processing to generate and refine an action of interest model 110 for action classification.

As represented in FIG. 1 by the arrow labeled with circled numeral one (1), adaptive action detection mechanism 102 extracts STIPs (spatial-temporal interest points) from video clips and estimates the distribution of a background model 108. More particularly, histogram of oriented gradients optical flow features are extracted at salient locations in a known manner, with a high feature dimension. Note that STIPs in videos provide rich representations of local gradients of edges and motions, however such features are often affected by lighting conditions, viewpoints, and partial occlusions, whereby STIPs from different datasets may have different distributions. To overcome this problem, instead of using STIPs based on quantized histograms, a probabilistic representation of the original STIPs is employed, by applying PCA (principal component analysis) to the STIPs, and then modeling them with (e.g., 512-component) Gaussian Mixture Models (GMMs). GMMs with large number of components are known to be able to model any given probability distribution function. To model the correlation between a source dataset and a target dataset, a prior distribution of the GMM parameters is used, in conjunction with an adaptation approach to incorporate the prior information for cross-dataset analysis.

As represented in FIG. 1 by the arrows labeled two (2), the adaptive action detection mechanism 102 adapts the background model 108 to an action of interest model 110 using the labeled data in the source dataset 104. In general, the background model 108 contains both background and actions of interest, and the source dataset 104 is used to extract similar action data (positive data) from the background model 108. If the source dataset is labeled, then the labels may be transferred to the appropriate actions in the target dataset, however even if unlabeled, similar actions may be detected. Details of the adaptation are described below.

With the adapted action of interest model 110, the adaptive action detection mechanism 102 estimates the location of an action instance (block 112) in the target dataset 106 by differentiating between the STIPs in the background and the STIPs for an action of interest. This is generally represented in FIG. 1 by the arrows labeled three (3), which are shown as dashed lines to help distinguish them from the other arrows. Note that the operations indicated by the arrows labeled two (2) and three (3) are iteratively repeated, as described below.

Turning to additional details, one example approach combines model adaptation and action detection into a Maximum a Posterior (MAP) estimation framework, which explores the spatial-temporal coherence of actions and good use of the prior information that can be obtained without supervision. The technology described herein combines action detection and classifier adaptation into a single framework, which provides benefits in cross-dataset detection. Note that cross-dataset learning and semi-supervised learning learn a model with limited amount of labeled data. However, semi-supervised learning assumes the labeled data and unlabeled data are generated from the same distribution, which is not the case in cross-dataset learning. In cross-dataset learning, the actions of interest are assumed to share some similarities across the datasets, but are not exactly the same, and further, the background models are typically significantly quite different from dataset to dataset. Because of this, semi-supervised learning is not suitable, and the technology described herein instead treats the action model in the source dataset as prior, and employs maximum a posterior estimation to adapt the model to the target dataset. Moreover, the model provides both classification and detection (spatial and temporal localization), while conventional semi-supervised learning algorithms considers only classification.

Another aspect is directed towards the spatial-temporal coherence nature of the video actions, using a three-dimensional (3D) subvolume to represent a region in the 3D video space that contains an action instance. As generally described in U.S. patent application Ser. No. 12/481,579, herein incorporated by reference, a 3D subvolume is parameterized as a 3D cube with six degrees of freedom in (x, y, t) space. Spatial and temporal localization of an action in a video sequence is rendered as searching for the optimal subvolume.

The technology described herein simultaneously locates the action and updates the GMM parameters. The benefits of doing so include that action detection provides more useful information to the user, and that locating the spatial-temporal subvolumes allows iteratively filtering out the STIPs in the background, thus refining the model estimation.

A video sequence may be represented as a collection of spatial-temporal interests points (STIPs), where each STIP is represented by a feature vector q. To model the probability of each STIP, a Gaussian Mixture Model represents a universal background distribution. If a GMM contains K components, the probability can be written as $$Pr(q|\theta) = \sum_{k=1}^{K} w^k \mathcal{N}(q; \mu^k, \Sigma^k)$$

where $\mathcal{N}(\cdot)$ denotes the normal distribution, and $\mu^k$ and $\Sigma^k$ denote the mean and variance of the kth normal component, respectively. Each component is associated with a weight $w^k$ that satisfies $\sum_{k=1}^{K} w^k = 1$. The parameter of the GMM is denoted by $\theta = \{\mu^k, \Sigma^k, w^k\}$, of which the prior takes the form:

$$Pr(\theta) = \prod_k Pr(\mu^k, \Sigma^k) \qquad (1)$$

where $Pr(\mu^k, \Sigma^k)$ is a normal-Wishart density distribution representing the prior information. In cross-dataset detection, $Pr(\theta)$ represents the prior information obtained from the source dataset 104. It is generally likely that in different datasets the action information may be correlated, and thus the prior $Pr(\theta)$ from the source dataset is likely beneficial for the action detection in the target dataset 106.

The task of action detection needs to distinguish the action of interest from the background. To this end, two GMM models are employed, namely a background model 108, $\theta_b = \{\mu_b^k, \Sigma_b^k, w_b^k\}$, and the model 110 for the actions of interest, $\theta_c = \{\mu_c^k, \Sigma_c^k, w_c^k\}$. The corresponding prior distributions are denoted as $Pr(\theta_b)$ and $Pr(\theta_c)$, respectively. The task of action detection is modeled as finding 3D subvolumes in spatial and temporal domains that contain the actions of interest.

Let Q={Q1, Q2, ...} denote the set of subvolumes, each of which contain an instance of the action. The union of Q is $U_Q = U_{Q \in Q} Q$ and let $\overline{U}_Q$ denote the complement of $U_Q$. By assuming that each STIP is independent of one another, the log likelihood of STIPs can be written as:

$$\mathcal{L} = Pr(U_Q; \theta_c) + Pr(\overline{U}_Q; \theta_b) \qquad (2)$$
$$= \sum_{q \in U_Q} \log Pr(q|\theta_c) + \sum_{q \in \overline{U}_Q} \log Pr(q|\theta_b) Pr(\theta_b)$$

To detect action in the target dataset, the mechanism 102 needs to find the optimal action model $\theta_c$ together with the action subvolume Q in the target dataset 106.

$$(\theta_c^*, Q^*) = \underset{\theta_c, Q}{\operatorname{argmax}} \mathcal{L} \qquad (3)$$

However, directly optimizing equation (3) is intractable. An effective approach in practice is to find the solution in an iterative way:

$$\text{given } Q, \theta_b, \theta_c^* = \underset{\theta_c}{\arg\max} \mathcal{L}(U_Q, \theta_c), \quad (4)$$

$$\text{given } \theta_c, \theta_b, Q^* = \underset{Q}{\arg\max} \mathcal{L}(U_Q, \theta_c), \quad (5)$$

where $\theta_c^*$ and $Q^*$ represent the updated action model and subvolumes, respectively. Note that the background model $\theta_b$ is fixed in one implementation, and is thus referred to as a universal background model.

Equation (4) provides a tool to incorporate the cross-dataset information. By way of example, consider a labeled source dataset S and an unlabeled target dataset T. The process can estimate $\theta_b$ by fitting the GMM with the STIPs in T. However, it is difficult to estimate $\theta_c$ because there is no label information of Q in T. However, $\theta_c$ may be obtained by applying equation (4) to the source dataset S. With an initial $\theta_c$, the label information in S may be used to update the estimation of $\theta_c$ and Q in T. This approach adapts the action model from S to T and is referred to as adaptive action detection. The following algorithm, also represented in FIG. 2, describes the adaptive action detection process.

Iterative Adaptive Action Detection

Figure 2:
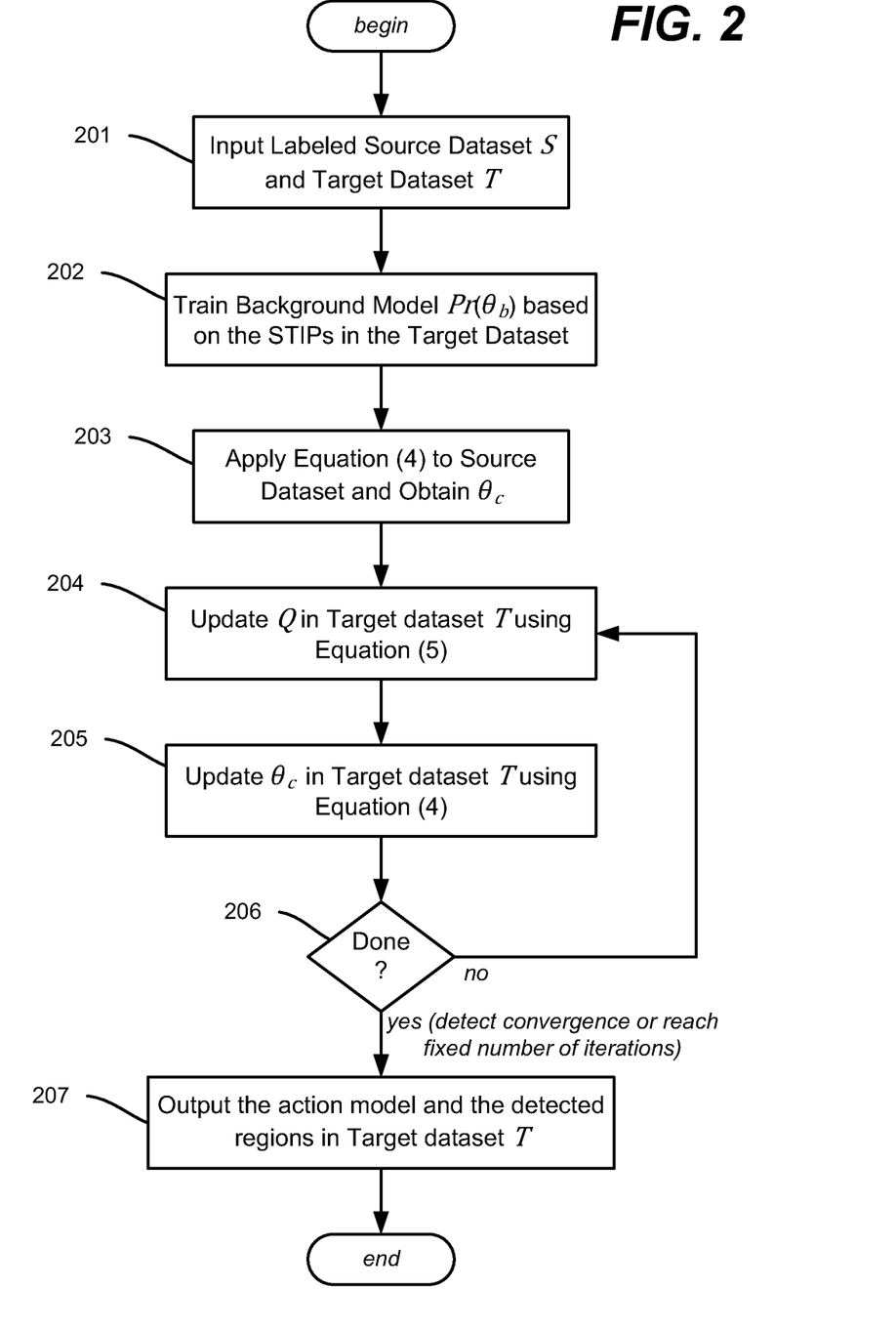
FIG. 2 is a flow diagram representing an iterative process for adaptively learning an action classification model.

| | |
|---|---|
| Step 201: | Input the labeled source dataset S and target dataset T. |
| Step 202: | Train background model $Pr(\theta_b)$ based on the STIPs in the T. |
| | In Source dataset S: |
| Step 203: | apply equation (4) to S and obtain $\theta_c$. |
| | In Target dataset T: |
| Step 204: | update equation Q using equation (5), |
| Step 205: | update equation $\theta_c$ using equation (4), |
| Step 206: | repeat steps 204 and 205 for several rounds. |
| Step 207: | Output the action model and the detected regions in T. |

In general, the objective function is optimized by fixing the action model and updating the set of subvolumes Q containing the action, then fixing the set of subvolumes and optimizing the action model $\theta_c$, and so on until convergence is detected (e.g., if the measured improvement between iterations is below some threshold) or some fixed number of iterations is performed. The action model may then be output for use as a classifier, along with data corresponding to the subvolumes (the detected regions of action of interest), e.g., the frames and locations therein.

Turning to computing the updated action model $\theta_c^*$, the optimal parameter $\theta_c$ maximizes equation (2):

$$\theta_{c*} = \underset{\theta_c}{\arg\max} \mathcal{L}(U_Q, \theta_c).$$

When Q is given and the background model $\theta_b$ is fixed, the problem is simplified as:

$$\theta_{c*} = \underset{\theta_c}{\arg\max} \sum_{q \in U_Q} \log Pr(q|\theta_c) Pr(\theta_c). \quad (6)$$

The model of $\mu_c^k$ in the source dataset is taken as prior. Because Gaussian distribution is the conjugate prior for Gaussian, the MAP estimation for equation (6) is obtained in a simple form:

$$\mu_c^k = \alpha^k E_c^k(x) + (1-\alpha^k)\mu_c^k$$

$$\Sigma_c^k = \beta^k E_c^k(x^2) + (1-\beta^k)(\Sigma_c^k + \mu_c^{kT}\mu_c^k) - \mu_c^{kT}\mu_c^k \quad (7)$$

where $\alpha^k$ represents the weights that adjust the contribution of the prior model to the updated model. The variable $E_c^k$ is the weighted summation of samples in the target dataset. Note that for faster speed and robustness, only $\mu^k$ (and not $\Sigma^k$) is updated. The variable $E_c^k$ can be estimated as:

$$E_c^k = \frac{1}{\sum_j p_{kj}} \sum_{qj \in U_Q} p_{kj} q_j \quad (8)$$

$$p_{kj} = \frac{w_k \mathcal{N}(q_j|\mu_k, \Sigma_k)}{\sum_k w_k \mathcal{N}(q_j|\mu_k, \Sigma_k)}$$

Note that the weighting parameter $\alpha^k$ also may be simplified as:

$$\alpha_k = \frac{\sum_j p_{kj}}{\sum_j p_{kj} + r}$$

where r is the controlling variable for adaptation. The adaptation approach effectively makes use of the prior information from source dataset 104, and requires only a small amount of training data to obtain the adaptation model.

Turning to subvolume detection, given the model $\theta_c$, the best subvolume containing the action of interest can be found.

$$U_Q^* = \underset{U_Q}{\arg\max} \mathcal{L}(U_Q, \theta_c)$$

where $$\mathcal{L} = \sum_{q \in U_Q} \log Pr(q|\theta_c) Pr(\theta_c) + \sum_{q \in \overline{U}_Q} \log Pr(q|\theta_b) \quad (9)$$

$$= \sum_{q \in U_Q} [\log Pr(q|\theta_c) Pr(\theta_c) - \log Pr(q|\theta_b) Pr(\theta_b)] +$$

$$\sum_{q \in U_Q \cup \overline{U}_Q} \log Pr(q|\theta_b) Pr(\theta_b)$$

The second term is constant given the universal background model 108. Thus, a simplified form of subvolume detection may be used:

$$U_Q^* = \underset{U_Q}{\arg\max} \sum_{q \in U_Q} \log \frac{Pr(q|\theta_c) Pr(\theta_c)}{Pr(q|\theta_b) Pr(\theta_b)} \quad (10)$$

Assigning each STIP a score:

$$f(q) = \log \frac{Pr(q|\theta_c)}{Pr(q|\theta_b)} - T = \log \frac{Pr(q|\theta_c) Pr(\theta_c)}{Pr(q|\theta_b) Pr(\theta_b)}$$

allows defining a scoring function for a subvolume Q:

$$f(U_Q) = \sum_{q \in U_Q} f(q). \quad (11)$$

It is known that the localization task based on the scoring function in (11) can be accomplished efficiently by a well-known Branch and Bound (BB) search method. Denoting $U_Q$ as the collection of 3D subvolumes gives $Q \in U_Q$. Assuming that there are two subvolumes $Q_{min}$ and $Q_{max}$, such that $Q_{min} \subseteq Q \subseteq Q_{max}$, let $f^+$ and $f^-$ be two functions defined as:

$$f^+(Q) = \sum_{q \in Q} \max(f(q), 0)$$

$$f^-(Q) = \sum_{q \in Q} \min(f(q), 0),$$

which gives:

$$f(Q) \leq f_0(Q) = f^+(Q_{max}) + f^-(Q_{min}) \quad (12)$$

for every $Q \in U_Q$, which is the basic upper bound function used in BB search.

In this manner, there is provided cross-dataset learning that adapts an existing classifier from a source dataset to a target dataset, while using only a small amount of labeling samples (or possibly no labels at all). The cross-dataset action detection is possible even though videos may be taken on different occasions, with different backgrounds, with actions that may appear differently with different people, and with different lighting conditions, scales and action speeds, and so forth. Notwithstanding, the actions in different datasets still share some similarities to an extent, and the classifier adaptation leverages the spatial and temporal coherence of the individual actions in the target dataset.

EXEMPLARY OPERATING ENVIRONMENT

Figure 3:
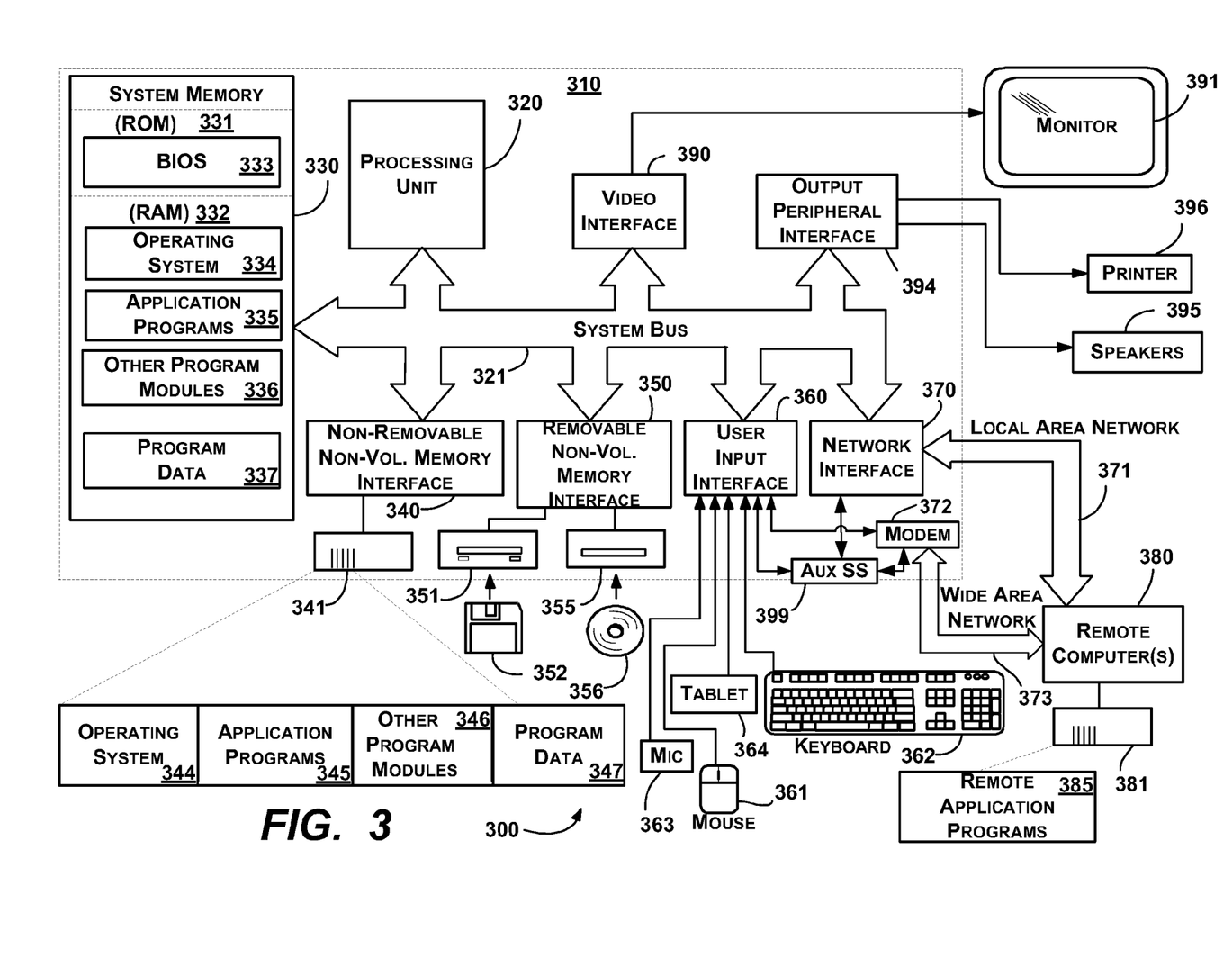
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor comprising: (a) processing a target dataset containing video data into a background model; (b) processing the background model into a current action model by processing a source dataset containing video data including action of interest data and at least some labeled video data comprising labels for actions of interests, using the action of interest data in the source dataset as a prior, and employing maximum a posterior estimation to adapt the background model to the target dataset; (c) searching the target dataset using the current action model to find one or more subvolumes containing similar action of interest data, including estimating locations of the actions of interest in the target dataset and differentiating between spatial-temporal interest points in the background model and spatial-temporal interest points for the action of interests; (d) updating the action model into an updated current action model based at least in part on the one or more subvolumes found in (c); and (e) refining the updated current action model by repeating steps (c) and (d) for a plurality of iterations.

2. The method of claim 1 wherein step (e) repeats steps (c) and (d) for a fixed number of iterations.

3. The method of claim 1 wherein step (e) repeats steps (c) and (d) until convergence is detected.

4. The method of claim 1 further comprising, outputting the action model for use as a classifier.

5. The method of claim 1 further comprising, outputting data corresponding to the one or more subvolumes found in (c).

6. The method of claim 1 wherein processing the target dataset into the background model comprises determining spatial-temporal interest points and computing a feature descriptor for each interest point.

7. The method of claim 1 wherein processing the target dataset into the background model comprises modeling spatial-temporal interest points as Gaussian mixture models.

8. The method of claim 1 wherein processing the background model into a current action model comprises modeling spatial-temporal interest points as Gaussian mixture models.

9. The method of claim 1 wherein searching the target dataset comprises performing a localization task based on a scoring function for the interest points.

10. The method of claim 9 wherein performing the localization task comprises performing branch and bound searching.

11. The method of claim 1 wherein the target dataset comprises unlabeled video data.

12. In a computing environment, a system comprising, an adaptive action detection mechanism that processes a target dataset comprising unlabeled video data into a background model comprising spatial-temporal interest points modeled as Gaussian mixture models, generates an action model from the background model and a prior distribution of Gaussian mixture model parameters for a source dataset that comprises at least some labeled data that corresponds to actions of interest, fixes a current instance of the action model, uses the current instance of the action model to find actions of interest in the target dataset by estimating locations of the actions of interest in the target dataset using spatial-temporal interest points, updates the current instance of the action model based upon the actions of interest found, and outputs the current instance of the action model and data corresponding to at least some of the actions of interest.

13. The system of claim 12 wherein the adaptive action detection mechanism refines the action model by (a) using the current instance of the action model to search for a set of subvolumes corresponding to the actions of interest, (b) fixing the set of subvolumes and updating the current instance of the action model into a new current instance based upon the set of subvolumes, and (c) repeating steps (a) and (b) for a plurality of iterations.

14. The system of claim 12 wherein the adaptive action detection mechanism generates the action model from the background model by using action data in the source dataset as a prior, and employing maximum a posterior estimation to adapt the background model to the target dataset.

15. The system of claim 12 wherein the background model and action model comprise spatial-temporal interest points modeled as Gaussian mixture models.

16. The system of claim 12 wherein the adaptive action detection mechanism uses the action model to find actions of interest in the target dataset by performing localization searching based on a scoring function and branch and bound searching.

17. One or more computer-readable storage media having computer-executable instructions, which when executed perform steps, comprising: (a) searching a target dataset using a current instance of an action model to find one or more detected regions containing action of interest data, wherein the action model is generated from prior information corresponding to actions of interest in a source dataset, wherein the source dataset comprises at least some labeled data corresponding to labels of actions of interests; (b) updating the current instance of the action model into a new action model based upon spatial-temporal coherence of the action of interest data of the target dataset; (c) refining the new action model by repeating steps (a) and (b) for a plurality of iterations; and (d) outputting the new action model and data corresponding to the detected regions.

18. The one or more computer-readable storage media of claim 17 having further computer-executable instructions comprising, before step (a), generating the action model by processing the target dataset into a background model and using the source dataset containing video data including action of interest data to process the background model into the action model.

19. The one or more computer-readable storage media of claim 18 wherein processing the target dataset into the background model comprises modeling spatial-temporal interest points as Gaussian mixture models.

20. The one or more computer-readable storage media of claim 17 wherein refining the action model by repeating steps (a) and (b) for a plurality of iterations comprises determining the iterations by detecting convergence or reaching a fixed number of iterations.

* * * * *